(12) United States Patent
Zakon et al.

(10) Patent No.: US 7,926,066 B2
(45) Date of Patent: Apr. 12, 2011

(54) ADAPTIVE CONTENT PLATFORM AND APPLICATION INTEGRATION WITH THE PLATFORM

(75) Inventors: Gary Zakon, Lexington, MA (US); Saurav Biswas, Needham, MA (US); Eric Boudreau, Leominster, MA (US); Vijay Sashti, Nashua, NH (US); William Despres, Tyngsboro, MA (US); Davin Desborough, Amherst, NH (US)

(73) Assignee: Openpages, Inc., Waltham, MA (US)

( * ) Notice: Subject to any disclaimer, the term of this patent is extended or adjusted under 35 U.S.C. 154(b) by 1368 days.

(21) Appl. No.: 11/099,065

(22) Filed: Apr. 5, 2005

(65) Prior Publication Data

US 2005/0289532 A1 Dec. 29, 2005

Related U.S. Application Data

(63) Continuation-in-part of application No. 10/256,613, filed on Sep. 26, 2002, now Pat. No. 7,356,771.

(51) Int. Cl.
*G06F 9/44* (2006.01)
*G06F 7/00* (2006.01)

(52) U.S. Cl. .................. 719/316; 707/769; 717/104

(58) Field of Classification Search ............ 707/103 R, 707/103 Y, 103 Z, 769; 715/234; 717/104, 717/105; 719/316
See application file for complete search history.

(56) References Cited

U.S. PATENT DOCUMENTS

| | | | |
|---|---|---|---|
| 6,345,288 B1 | 2/2002 | Reed et al. | |
| 6,397,195 B1 | 5/2002 | Pinard et al. | |
| 6,671,673 B1 | 12/2003 | Baseman et al. | |
| 6,735,590 B1 | 5/2004 | Shoup et al. | |
| 6,816,904 B1 | 11/2004 | Ludwig et al. | |
| 6,874,001 B2 * | 3/2005 | Narang et al. | 707/203 |
| 6,951,011 B1 | 9/2005 | Sexton | |
| 6,999,966 B2 * | 2/2006 | Liang et al. | 707/100 |
| 7,010,510 B1 | 3/2006 | Schellhorn | |
| 7,058,648 B1 | 6/2006 | Lightfoot et al. | |
| 7,065,522 B2 | 6/2006 | Taylor et al. | |
| 7,158,988 B1 * | 1/2007 | Kirkpatrick et al. | 707/102 |

(Continued)

FOREIGN PATENT DOCUMENTS

WO WO 0113287 A1 * 2/2001

OTHER PUBLICATIONS

International Search Report and Written Opinion, International Patent Application No. PCT/US06/12530, mailed Jul. 2, 2008 (10 pages).

*Primary Examiner* — Andy Ho
*Assistant Examiner* — Charles E Anya
(74) *Attorney, Agent, or Firm* — Wilmer Cutler Pickering Hale and Dorr LLP

(57) ABSTRACT

An adaptive content platform and application integration of with the platform is described. The adaptive content platform includes one or more content-enabled, dependent applications forming an application layer and a services layer that has services shared by the each of the one or more content-enabled, dependent applications. The services layer includes at least workflow, repository, and publishing services. Each content-enabled, dependent application is object modeled in the repository services in a hierarchical structure. The object types modeled in the repository may have content associated with them. The content may be stored in a data layer that is in communications with the services layer.

65 Claims, 13 Drawing Sheets

U.S. PATENT DOCUMENTS

| | | |
|---|---|---|
| 7,203,695 B2 | 4/2007 | Hoffschulz et al. |
| 7,228,304 B1 | 6/2007 | Wong et al. |
| 7,246,137 B2 | 7/2007 | Paulus et al. |
| 7,287,218 B1 * | 10/2007 | Knotz et al. .............. 715/209 |
| 7,305,419 B1 | 12/2007 | Cosby et al. |
| 7,313,812 B2 | 12/2007 | Robinson et al. |
| 7,428,519 B2 | 9/2008 | Minsky et al. |
| 2002/0083124 A1 | 6/2002 | Knox et al. |
| 2003/0014442 A1 * | 1/2003 | Shiigi et al. .............. 707/513 |
| 2003/0204835 A1 * | 10/2003 | Budhiraja et al. .......... 717/120 |
| 2003/0229812 A1 | 12/2003 | Buchholz |
| 2003/0233404 A1 | 12/2003 | Hopkins |
| 2003/0236786 A1 | 12/2003 | Shi et al. |
| 2004/0187140 A1 | 9/2004 | Aigner et al. |
| 2004/0205572 A1 * | 10/2004 | Fields et al. .............. 715/513 |
| 2004/0216084 A1 * | 10/2004 | Brown et al. .............. 717/102 |
| 2004/0230468 A1 | 11/2004 | King et al. |
| 2004/0260566 A1 | 12/2004 | King |
| 2004/0260582 A1 | 12/2004 | King et al. |
| 2004/0260583 A1 | 12/2004 | King et al. |
| 2004/0260591 A1 | 12/2004 | King |
| 2004/0260628 A1 | 12/2004 | Minton et al. |
| 2004/0260634 A1 | 12/2004 | King et al. |
| 2005/0065839 A1 | 3/2005 | Benson et al. |
| 2005/0065925 A1 | 3/2005 | Weissman et al. |
| 2005/0209899 A1 | 9/2005 | King et al. |
| 2005/0223022 A1 | 10/2005 | Weissman et al. |
| 2005/0228759 A1 | 10/2005 | King |
| 2005/0283478 A1 | 12/2005 | Choi et al. |
| 2006/0059026 A1 | 3/2006 | King et al. |
| 2006/0059031 A1 | 3/2006 | Hertel-Szabadi et al. |
| 2006/0074739 A1 | 4/2006 | King et al. |
| 2006/0085412 A1 * | 4/2006 | Johnson et al. ............ 707/4 |
| 2006/0089861 A1 | 4/2006 | King et al. |
| 2006/0106686 A1 | 5/2006 | King et al. |

* cited by examiner

ADAPTIVE CONTENT PLATFORM AND APPLICATION INTEGRATION WITH THE PLATFORM

RELATED APPLICATIONS

This is a continuation-in-part of U.S. patent application Ser. No. 10/256,613 filed Sep. 26, 2002 and published as U.S. 2004/0010796 A1 on Jan. 15, 2004 (now U.S. Pat. No. 7,356,771 B2).

FIELD OF THE INVENTION

This invention relates to software development and, more particularly, to software development platforms and application integration with such platforms.

BACKGROUND

For a suite of applications developed for a common software platform (e.g., an application server platform), each application within the suite typically includes a group of services (e.g., content management services, workflow services, publishing services, search and query services) that are common amongst the applications in the suite.

As the software platform does not allow the services of one application to be shared by another, these services must be coded for and included in each application written for the software platform, even though multiple applications use common services. It would be very useful for there to be an ability to share certain services and ability to have dynamic associations among the elements of any particular application.

Applications, such as independent application 48 in FIG. 1, that do not share services will have the above enumerated services captured only for the purposes of implementation and operation of that application without the difficulties that arise if the services were shared among a number of applications. It would be very helpful if a number of applications could share such services but each application could still be distinguished from the other applications sharing these services and not have existing problems in sharing services.

SUMMARY

According to an aspect of this invention, an adaptive content platform includes one or more content-enabled, dependent applications (thus forming an application layer), each of which includes a user interface and business logic. A services layer, which is interfaced with the content-enabled dependent applications and a software infrastructure (e.g., an application server), provides one or more services that are usable by the content-enabled, dependent applications.

One or more of the following features may be included in the adaptive content platform. The services layer includes a unique application programming interface for each of the one or more services, such that dependent applications using a specific service make requests through the application programming interface assigned to that service.

The services include a content management service (for storing and managing content and files), which includes: a repository service for storing files; and a search service for allowing users to search files stored by the repository service, for example.

The services also include a workflow and collaboration service (for managing projects and users), which includes: a workflow service for managing the workflow of files; a user management and authentication service for managing the users and user groups; and an events and notification service for managing and broadcasting notifications to the users that were generated by the services, for example.

Additionally, the services include a multi-modal content creation service (for manual creation and automated importation and conversion of files), which includes: a transformation and content handling service for converting the formats of files; a desktop integration service for manual contribution of content; and an import service for facilitating file importation from external systems, for example.

The services further include a multi-channel deployment service (for publishing files to one or more publishing channels), which includes: a publishing service for publishing files to one or more publishing channels (such as a web site, an email broadcast, a wireless broadcast, a syndication stream, or a printed publication, for example); a dynamic publishing service; and a static publishing service, for example.

The above-described adaptive content platform and distributed computing system may be implemented as a method or a sequence of instructions executed by a processor.

One or more advantages can be provided from the above described adaptive content platform. By providing the programmer with a common set of reusable services, applications are no longer required to include stand-alone services as shown at 45 in FIG. 1. Since these applications are not required to include services, application development is significantly accelerated and deployment is simplified. Additionally, by using a common set of services, compatibility issues are minimized. Further, as applications share a common set of services, application size is reduced. In addition, by separating an application's services from the application's business logic/user interface, distributed computing is possible, leading to superior scalability and availability.

Preferably, the common set of services for use with all platform-based applications are the workflow, repository, and publishing services. These services work cooperatively for effecting operation of the various supported applications. The system of the present invention permits the various dependent applications to be object modeled in the repository services, and workflow and publishing services are leveraged from their association with the repository services.

According to the present invention, the application may be object modeled in the repository service based on a hierarchical structure of the application. Once the application is object modeled in the repository it may be query searched to return not only specified content, but richer results, such as a subset of the hierarchical structure or action items to be performed by an entity.

The details of a particular application object may be changed at any time as long as the system user has authorization to access the object and its content, and authorization to make changes once it has accessed the object. The present invention also permits the application objects and/or the entire hierarchical structure to be labeled at particular points in time and timestamped. The association of application objects may be tracked so that there will be recognition of any changes in the relationships of the objects or changes in the content of a particular application object.

Further, the workflow routing that may relate to a particular application object may be controlled by the content associated with that application object.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
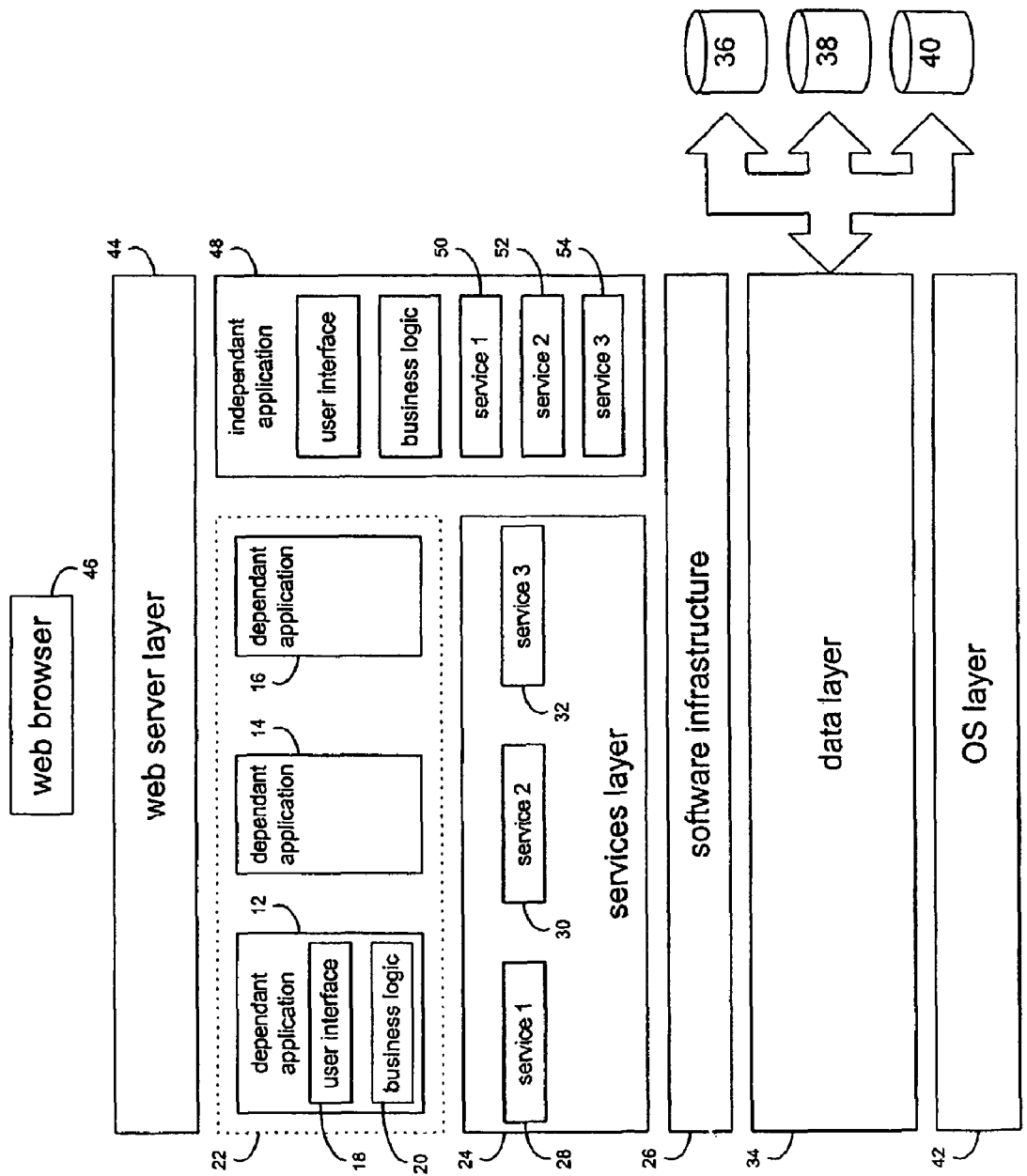
FIG. 1 shows a block diagram of an adaptive content platform.

Adaptive content platform 10 is a multi-tiered software architecture that includes a services layer 24 for interfacing application layer 22 and a software infrastructure 26. An example of software infrastructure 26 is an application server. Examples of an application server are BEA Weblogic™ and IBM Websphere™, both of which implement the Java™ 2 Enterprise Edition standard ("J2EE").

Dependent applications 12, 14, and 16 may be J2EE compliant dependent applications that adhere to v1.3 standards and are compatible with, and run on, a J2EE application server.

Services layer 24 provides a group of services 28, 30, 32, which are available for use by dependent applications 12, 14, 16. Examples of these services include content management services, search services, and file conversion services, for example. These services, which will be discussed below in greater detail, are shared services common to the dependent applications.

A data layer 34 is interfaced to software infrastructure 26 and provides data services for adaptive content platform 10. Data layer 34 may provide access to database servers 36, such as Oracle™, IBM DB2™, and Microsoft SQL Server™. Further, data layer 34 may provide access to file servers 38, such as Microsoft Windows 2000 Servers™, Microsoft Windows NT Servers™, and Unix Servers™. Additionally, data layer 34 may provide access to legacy systems 40 applications and data that have been inherited from languages, platforms, and techniques earlier than current system technology.

Typically, data layer 34 is interfaced with operating system (OS) layer 42, which includes the operating system that manages the above-described layers, infrastructures, and dependent applications. Examples of compatible operating systems are Windows™, Solaris™, and Linux™.

Web server layer 44, as shown, is interfaced with application layer 22 that includes dependent applications 12, 14, 16. Web server layer 44 permits the system user to use and access the functionality of the individual dependent applications with web browser 46. Examples of web browsers are Microsoft Internet Explorer™ and Netscape Navigator™. Further, examples of web server layer 44 are Microsoft Internet Information Server™ and Apache Web Server™.

By combining user interface 18 and business logic 20 of dependent application 12 with one or more of the services 28, 30, 32 offered by the services layer 24, the functionality of a "stand-alone" independent application 48 can be emulated without the application having to include dedicated services 50, 52, and 54.

Concerning the services 28, 30, and 32, offered by services layer 24, these services typically can be loosely described as four groups of services. They are content management, workflow and collaboration, multi-modal content creation, and multi-channel deployment. Each will be discussed subsequently.

Figure 2:
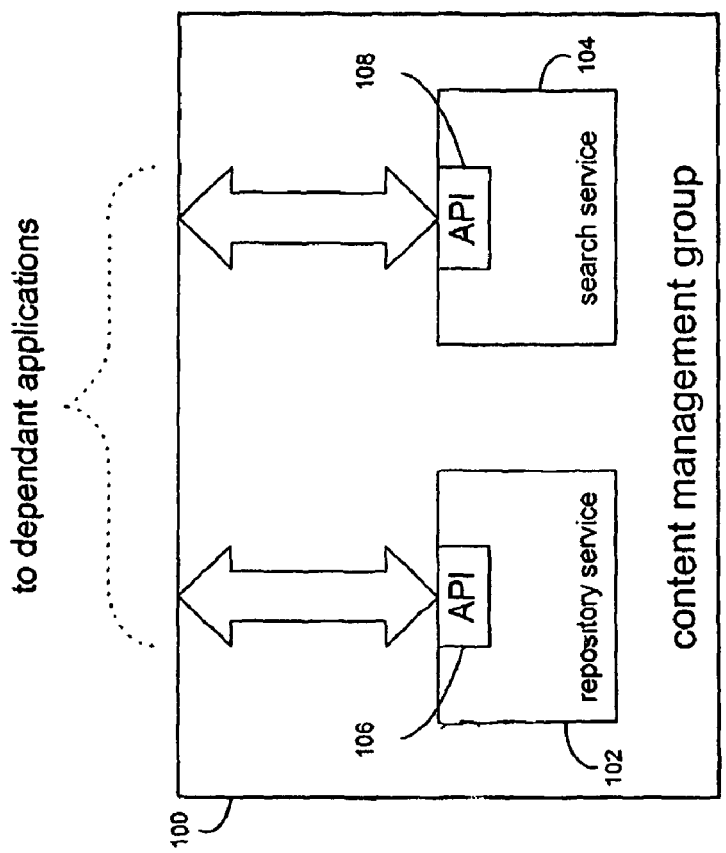
FIG. 2 shows a block diagram of a content management group of the adaptive content platform.

Referring to FIG. 2, the content management group 100, which stores and manages files and content used by the adaptive content platform, may include a repository service 102 and a search service 104. Repository service 102 works in conjunction with the data layer (generally), and the database servers, the file servers, and the legacy systems (specifically) to store, organize, and manage files and content ("files").

Repository service 102 allows for the production, organization, and management of numerous content types that define the specific type of files being produced and managed. Additionally, repository service 102 allows users/administrators to define numerous property fields or meta-data fields (e.g., release date, revision number, production date, revision date, and approval date, for example) that define and refine the files stored by the data layer. Access to the files managed by repository service 102 can be controlled by regulating the users who can view, check out, edit, print, and save a particular file, for example. Additionally, the data structure in which the files are stored is defined and controlled using repository service 102. Typically, repository service 102 works in conjunction with a relational database, e.g., database 36 (FIG. 1), which is accessed through data layer 34 (FIG. 1).

As will be discussed, the preferred structure that is used to object model the dependent application in repository services 102 is a hierarchical tree structure. The object types that model the dependent application will have content associated with them.

The search service 104 allows a user to search the files stored by the repository service 102. Searches may be performed on either file properties or content. If the files are stored in a structured database (as described above), search service 104 may be an SQL ("structured query language") database query engine. Alternatively, if the files are stored as HTML or XML ("Extensible Markup Language") based documents, search service 104 may use search engine technology to generate a list of relevant documents.

The dependent applications 12, 14, and 16 (FIG. 1) described above may access each service offered by content management group 100, repository service 102 and search service 104, by making the appropriate request of and establishing a connection through the API ("application programming interface") assigned to that particular service. For example, API 106 is assigned to repository service 102 and API 108 is assigned to search service 104. Therefore, if a system user of a dependent application wanted to execute a search for a particular file, dependent application 12 that entity would make the appropriate request through API 108.

Figure 3:
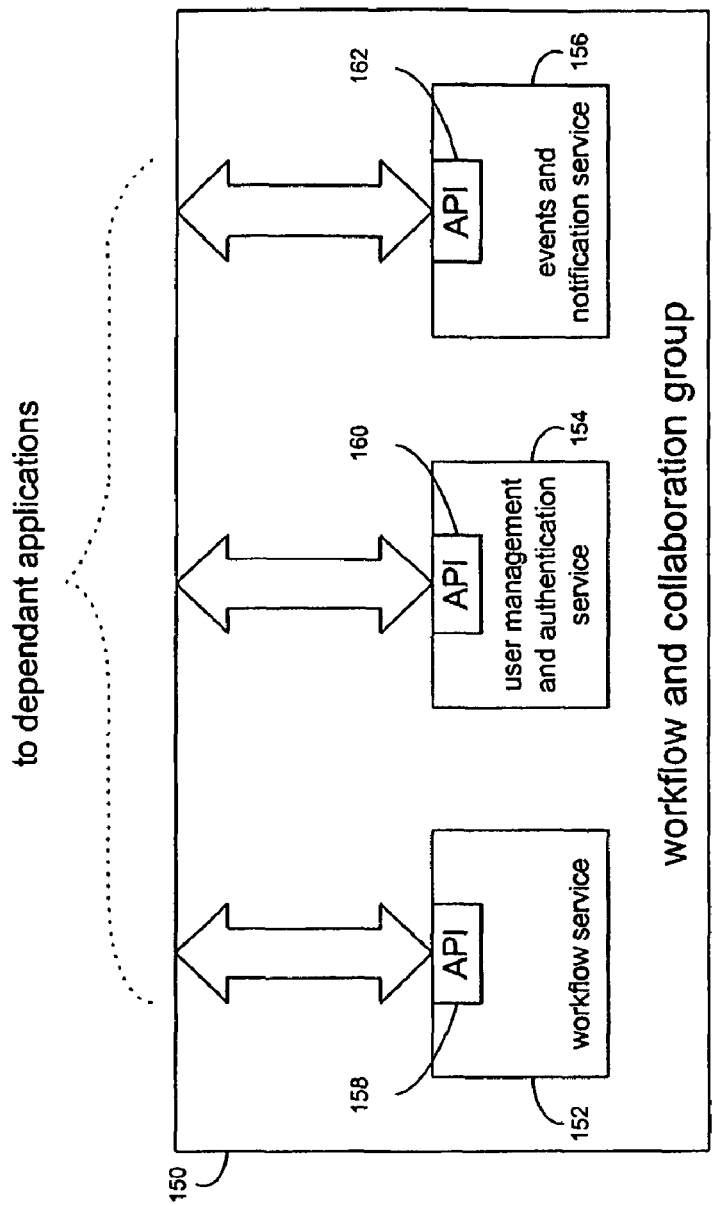
FIG. 3 shows a block diagram of a workflow and collaboration group of the adaptive content platform.

Referring to FIG. 3, workflow and collaboration group 150, which manages projects and users of the adaptive content platform, may include workflow service 152, user management and authentication service 154, and events and notification service 156. Each of these services will be discussed subsequently.

Workflow service 152 allows the administrator or system user to control the workflow of files through adaptive content platform 10. For example, if a file is produced for publishing purposes, that file may need to be approved by a mid-level manager prior to it being sent to an upper level manager. Further, the upper level manager may have to approve the file prior to it being published or otherwise disseminated. Therefore, workflow service 152 could mandate that the file be approved by a mid-level manager prior to it being sent to the higher level manager, who approves it prior to publication. Further, workflow service 152 may assign time limits for the completion of certain tasks, such as the mid-level or upper level review and approval process.

User management and authentication service 154 provides a set of tools to the system user/administrator that allows them to manage users and user groups. Individual users can be produced and deleted using user management and authentication service 154. Further, the rights and privileges of these individual users also can be controlled and regulated. Additionally, these users can be assigned to, moved between, and deleted from various users groups, which also are maintained using user management and authentication service 154. Further, as rights and privileges can be assigned to a user group, by adding an individual user to a user group, the rights or privileges of an individual user can be efficiently defined.

Events and notification service 156 allows for the delivery of notification events generated by the services offered by service layer 24 (FIG. 1). These messages may be delivered to individual users of the system, broadcast to entire user groups, or delivered to the various services offered by the service layer 24 (FIG. 1).

As described above, the dependent applications 12, 14, and 16 (FIG. 1) may access each service offered by workflow and collaboration group 150, including workflow service 152, user management and authentication service 154, and the events and notification service 156, by making the appropriate request of, and establishing a connection through, the API assigned to that particular service. For this particular group, API 158 is assigned to workflow service 152, API 160 is assigned to user management and authentication service 154, and API 162 is assigned to events and notification service 156.

Figure 4:
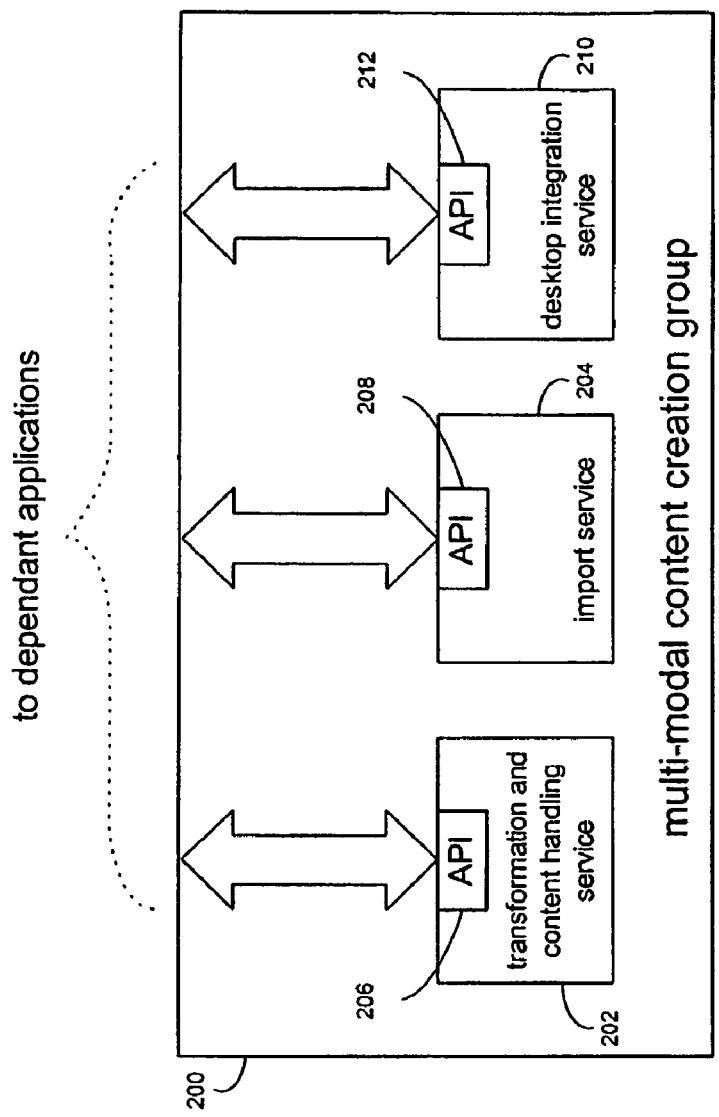
FIG. 4 shows a block diagram of a multi-modal content creation group of the adaptive content platform.

Referring to FIG. 4, multi-modal content creation group 200, which imports and converts files for the adaptive content platform, may include transformation and content handling service 202, import service 204, and desktop integration service 210. Each of these services now will be discussed separately.

Transformation and content handling service 202 provides file format conversion services that permit the system user or administrator to import files of various types and convert them over into a common format, such as XML and HTML. Converter templates are available for popular applications, such as Microsoft Word™, Microsoft Excel™, Adobe PDF™, and Microsoft PowerPoint™.

Import service 204 permits for automated import of files from external systems. Import service 204 is configured to monitor, on a periodic basis, the files located on a network drive, a FTP ("file transfer protocol") site, and a HTTP site. When new files are detected on one of these resources, the files are automatically imported into the system. Further, if a format conversion is required, import service 204 will work in conjunction with transformation service 202 to import and convert the file.

The desktop integration service 210 permits content to be contributed by users via standard desktop creation tools. These tools include the Microsoft Office™ suite, as well as Adobe™, and Macromedia™ applications. Preferably, the service uses the WEBDAV protocol (WEB-based Distributed Authoring and Versioning), which is an extension of the HTTP protocol, to communicate with the desktop tools.

As described above, the dependent applications 12, 14, and 16 (FIG. 1) may access each service offered by multi-modal content creation group 200, including transformation service 202, import service 204, and desktop integration service 210, by making the appropriate request of and establishing a connection through the API assigned to that particular service. For this particular group, API 206 is assigned to the transformation service 202, API 208 is assigned to the import service 204, and API 212 is assigned to the desktop integration service 210.

Figure 5:
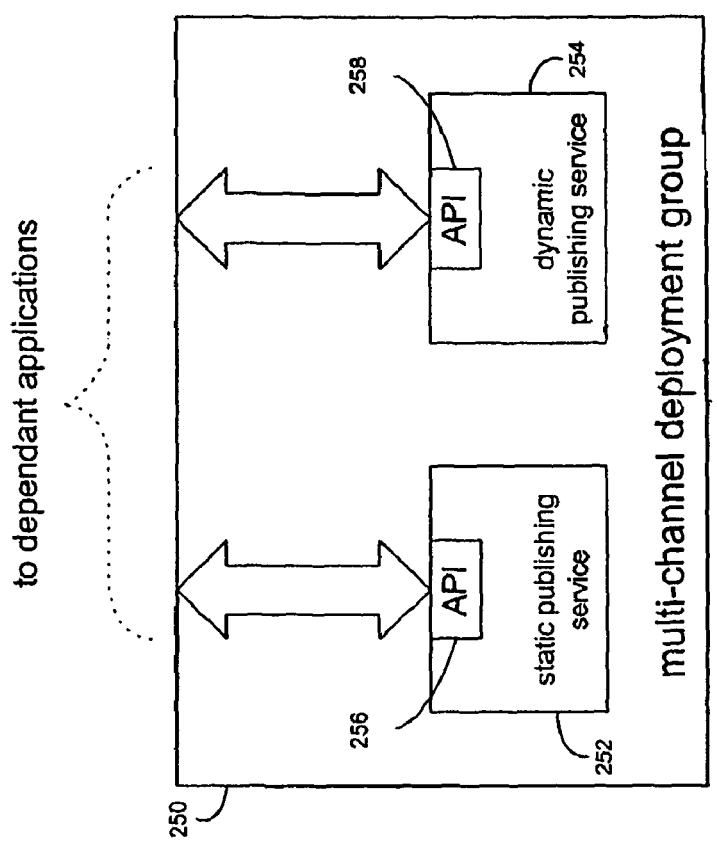
FIG. 5 shows a block diagram of a multi-channel deployment group of the adaptive content platform.

Referring to FIG. 5, multi-channel deployment group 250, which publishes files and reports to one or more publishing channels, may include a static publishing service 252, and a dynamic publishing service 254. Static publishing service 252 allows for proactive publishing of files and reports based on predefined templates. Therefore, the structure and format of the file published (and the document produced) is defined ahead of time and is not varied depending on the content of the document. Additionally, the content itself is semi-dynamic in that it changes periodically (e.g., a few times a week). An example of static documents generated using a static publishing service is a newsroom home page of a corporate web site in which one hundred press releases are currently being displayed. The home page is a collection of one hundred summary links, and each link leads to a press release detail page. A corporate communications officer can publish the home page and the one hundred detail pages by invoking the static publishing service, which merges the appropriate press release content with the detail page template to generate HTML. By generating the pages using static publishing, the communications officer ensures that web site visitors have fast page retrieval, since the content is already in HTML format and does not need to be regenerated for every website visitor.

Dynamic publishing service 254 allows for reactive publishing of files and reports that are dynamically altered based on current conditions, user preferences, and query results, for example. An on-line auction house that has one hundred items for sale may create a dynamic document in response to a system user query. For example, while one hundred items may be offered, the system user, an avid World War II buff, only may be interested in those items that relate to World War II. Therefore, the system user would enter his/her search criteria and a dynamic document or report would be generated that includes fourteen items, each of which is related to World War II. This dynamically generated list, which itemizes the fourteen items, also may specify the starting bid, the current bid, and the auction ending time for each item. By generating this document with dynamic publishing services 254, documents can be generated that more accurately reflect current conditions.

Regardless of whether static publishing service 252 or dynamic publishing service 254 is used to produce a file or report, the file or report may be published over various channels. These include, but are not limited to, a web site, an email broadcast, a wireless broadcast, a syndication stream, and a printed publication, for example. The file or report also may be published in various formats, such as HTML, XML, and PDF.

For web site publishing, the file being published may be posted to a website so that the file or report is accessible by various system users and guests. If security or access is a concern, the file may be published on an intranet (which is not remotely accessible), or within a restricted access user section of a website.

For email broadcasts, the file or report may be published as an attachment to the email that is distributed. Alternatively, the file or report may be converted into a format, such as ASCII text and HTML, that then may be incorporated into the body of the email.

For wireless broadcasts, the file or report may be transmitted over a wireless network. This file or report may be text-based, such as an email attachment sent to a wireless email device, or multimedia-based, such as a sound file sent to a cellular telephone.

For syndication streams, the file or report may be published on data streams that are text-based, such as streaming messages, audio-based, such as streaming audio, video-based, such as streaming video, or multimedia-based, such as streaming audio/video.

For printed publications, the file or report being published may be printed on traditional printing systems and distributed using conventional distribution paths, interoffice mail, courier, or the postal service.

As described above, dependent applications 12, 14, and 16 (FIG. 1) access each service offered by multi-channel deployment group 250, static publishing service 252 and dynamic publishing service 254, by making the appropriate request of and establishing a connection through the API assigned to that particular service. For this particular group, API 256 is assigned to static publishing service 252 and API 258 is assigned to dynamic publishing service 254.

Figure 6:
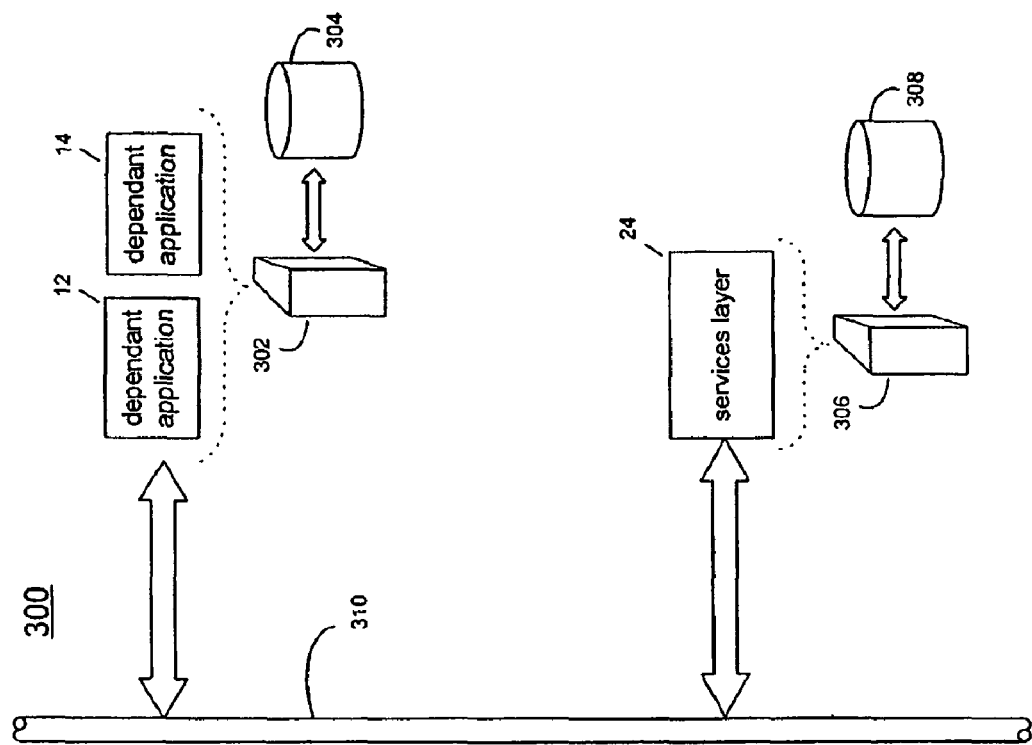
FIG. 6 shows a block diagram the adaptive content platform incorporated into a distributed computing system.

Referring to FIG. 6, distributed computing system 300 is shown which incorporates the adaptive content platform 10. Distributed computing system 300 includes local (or first) computing device 302 that executes one or more content enabled dependent applications 12 and 14 that includes business logic and a user interface (FIG. 1).

Storage device 304 stores the individual instruction sets and subroutines for dependent applications 12 and 14. Storage devices 304 may be a hard disk drive, a tape drive, an optical drive, a RAID array, a random access memory (RAM), or a read-only memory (ROM), for example. Local computing device 302 includes at least one processing unit and main memory system (both not shown).

A remote (or second) computing device 306, which may be a web browser, executes services layer 24, as described above. Typically, services layer 24 is interfaced with a software infrastructure (not shown), which is interfaced with a data layer (not shown), which is interfaced with an OS layer (not shown).

Storage device 308 stores the individual instruction sets and subroutines of services layer 24 and any additional required layers or infrastructure. Storage device 308 may be a hard disk drive, a tape drive, an optical drive, a RAID array, a random access memory (RAM), or a read-only memory (ROM), for example. Remote computing device 306 includes at least one processing unit (not shown) and main memory system (not shown).

Local computing device 302 and remote computing device 306 are interconnected with a network 310, such as a LAN, WAN, the Internet, the World-Wide Web, or an intranet, for example.

While the above-described embodiment discusses the deployment of the services layer on a single second computer, other configurations are possible within the scope of the present invention. For example, the system configuration may be such that each service or a group of services is deployed on its own dedicated computer.

Further, while the above-described embodiment describes a local and a remote computing device, this is not intended to define the physical location of either computing device and is merely intended to indicate that the second computing device is remote or separated from the first computing device.

Yet further, while the above-described embodiment discusses the use of content-enabled dependent applications, other configurations are possible within the scope of the present invention. For example, the system may be configured so that it uses data-enabled dependent applications, which are ones designed to manage data, as opposed to content.

Still further, while the above-described embodiment specifies that software infrastructure 24 is an application server, other configurations are possible within the scope of the present invention. For example, the system may be configured such that the software infrastructure as a general-purpose operating system, such as UNIX, Windows 2000, or a special-purpose operating system, embedded OS or real time OS.

Further yet, while the above-described embodiment illustrates the availability of three services and three dependent applications, the actual number of services and dependent applications can be adjusted based on system requirements.

Figure 7:
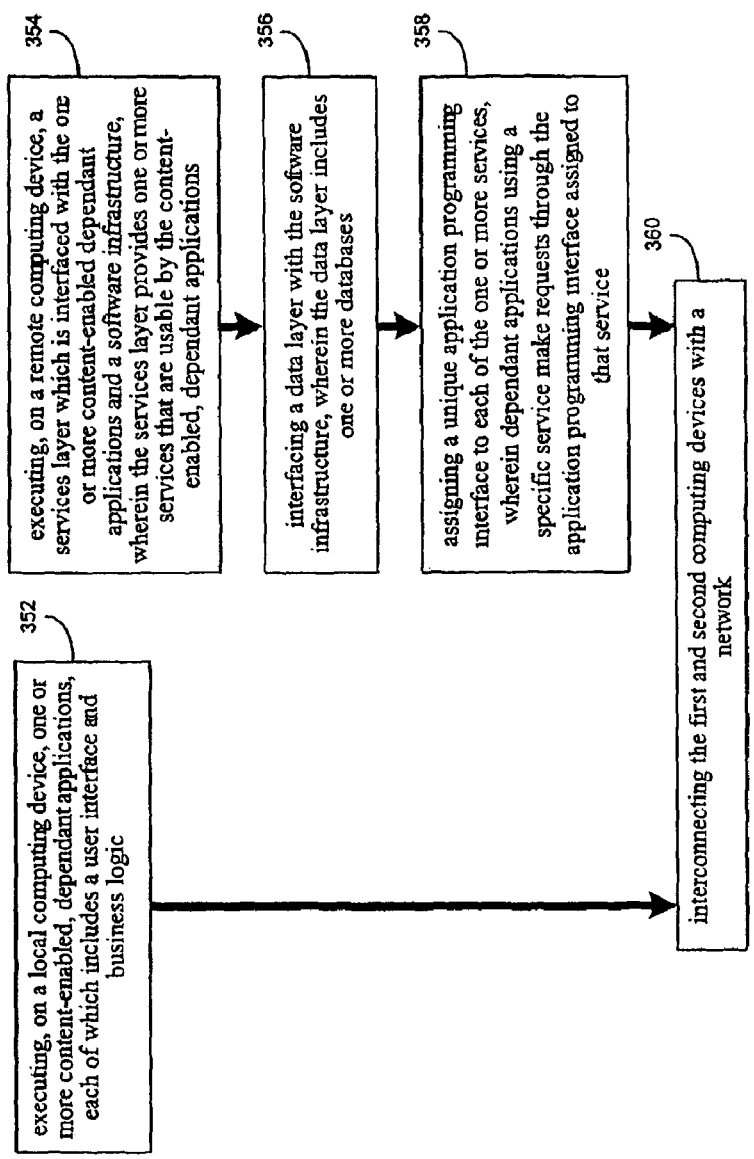
FIG. 7 shows a flow chart of a distributed computing method.

Referring to FIG. 7, distributed computing method 350 is shown. One or more content-enabled, dependent applications are executed on a local computing device at 352. Each dependent application includes a user interface and business logic. A services layer, which is interfaced with the dependent applications and a software infrastructure, is executed on a remote computing device at 354. The services layer provides one or more services that are usable by the content-enabled, dependent applications.

A data layer, which includes one or more databases, is interfaced with the software infrastructure at 356. A unique application programming interface is assigned to each of the services at 358. The dependent applications using a specific service may make requests through the API assigned to that service.

The first and second computing devices are interconnected with a network at 360.

Figure 8:
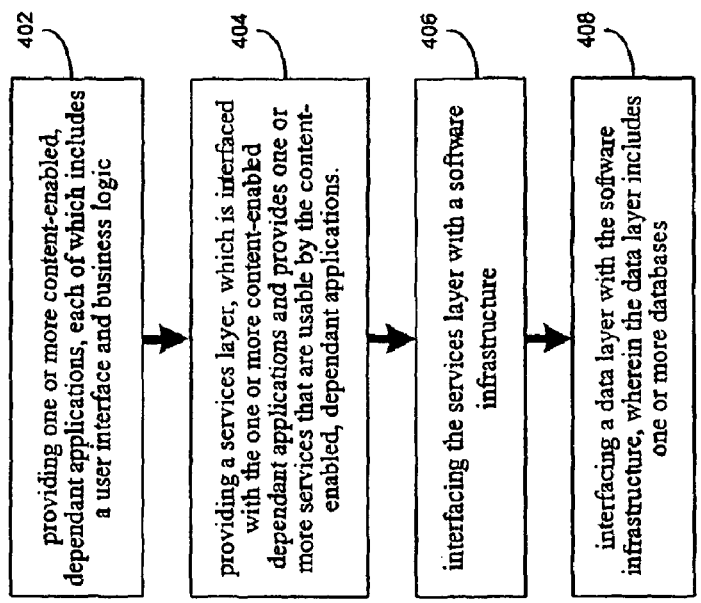
FIG. 8 shows a flow chart of a multi-tier software development method.

Referring to FIG. 8, multi-tier software development method 400 is shown. One or more content enabled dependent applications are provided at 402, each of which includes a user interface and business logic. A services layer is provided at 404, which is interfaced with the one or more content enabled dependent applications and provides one or more services that are usable by the content-enabled, dependent applications. The services layer is interfaced with a software infrastructure at 406. The software infrastructure is interfaced with a data layer at 408. The data layer includes one or more databases.

Referring generally to FIGS. 9-15, the common services that are shared by the dependent applications and the integration of dependent applications with these services and other platform components will be described.

In FIG. 1, application layer 22 included dependent applications 12, 14, and 16. As stated, preferably, these applications are content-enabled dependent applications. These dependent applications manage and process content. The three services of the services layer, the workflow, repository, and publishing services, are the principal enablers of the integration of dependent applications with the system of the present invention as will be described.

Figure 9:
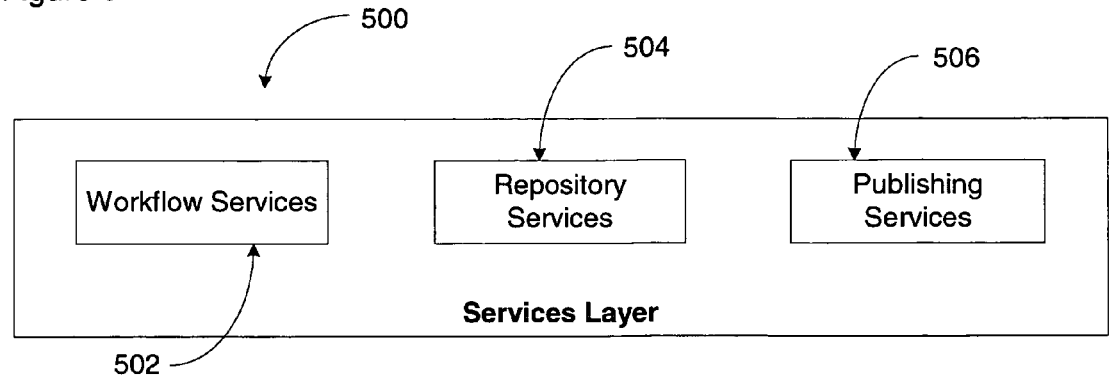
FIG. 9 shows the common set of workflow, repository, and publishing services of the services layer that support application object modeling in the repository service and leveraging of workflow and publishing services.

FIG. 9, generally at 500, shows the three shared services that facilitate the integration the content-enabled dependent applications. These are workflow service 502, repository service 504, and publication service 506. It is through these services that each dependent application connects to data layer 34 and database 36, 38, and 40 to the extent that these files, folders or other structure of the services layer connect to content stored in the data layer.

Workflow service 502 permits the system user to control the workflow of files and folders through adaptive content platform 10. Repository service 504 permits the production, organization, and management of the application objects and content associated with objects. Publication service 506 permits proactive publishing of files and reports based on predefined templates (static publishing) and reactive publishing of files and reports that are dynamically altered based on current conditions, user preferences, and query results (dynamic publishing).

According to the present invention, to enable dependent application 12, 14, or 16 (FIG. 1), in the environment of the shared services, preferably, each dependent application is object modeled in repository service 504. This is performed by developing object types that capture the features of the dependent applications and modeling these object types in the repository services. Each dependent application will have its own distinct object model in the repository services. An example of the object types of a dependent application modeled in repository services 504 is shown in FIG. 10.

Figure 10:
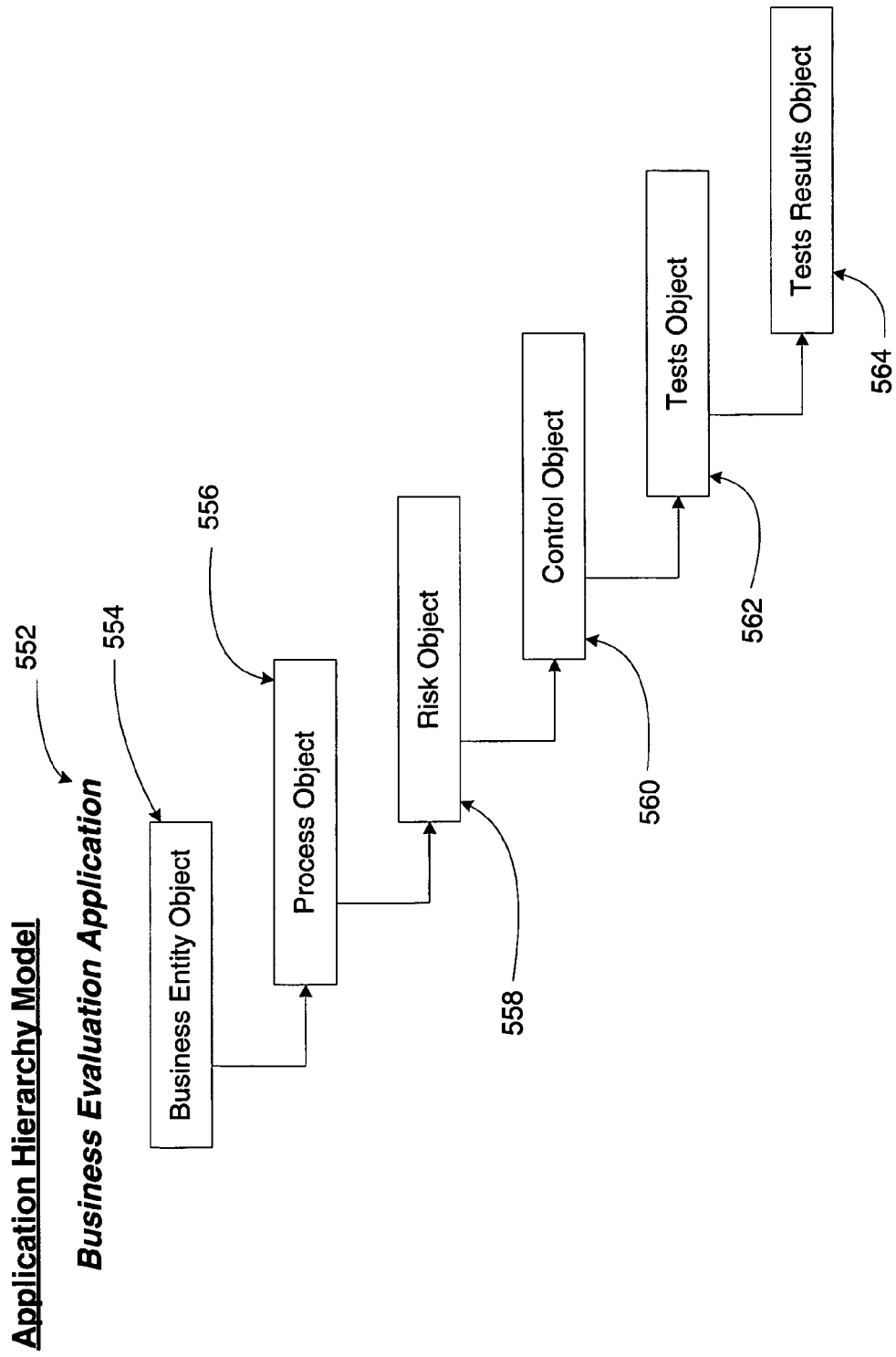
FIG. 10 shows a hierarchical structure for a dependent application that is modeled in the repository services according to object type.

Referring to FIG. 10, generally at 550, preferably, a dependent application that is object modeled in the repository services will have a hierarchical structure that is organized in a tree-structure. The dependent application that is object modeled in the repository 504, for example, is representative business evaluation application 552. Business evaluation application 552 is meant to be representative of any application supported by adaptive content platform 10.

The tree-structure of business evaluation application 552 is one form of modeling the application objects types. It is understood that other modeling methods may be used and still be within the scope of the present invention.

In FIG. 10, business evaluation application 552 shows a hierarchical association of the six object types used to model the application. The six associated object types in the hierarchical structure are business entity object type 554, process object type 556, risk object type 558, content object type 560, test object type 562, and tests results object type 569.

The first object type modeled is business entities object 554 that is directed to all of the business entities of the company, such as division, subsidiaries, etc. The second object type modeled is business processes object 556 that relates to processes of the company that are being assessed for particular risks. The third object type modeled is risks object 558 that relates to the risks the company faces and the characteristics of these risks. The fourth object type modeled is controls object 560 that relates to the procedures that the company would use to mitigate its risks. The fifth object type that is modeled is tests object 562 that is used to test that controls and consists of test plans for this purpose. And finally, the sixth object type modeled is test results object 564 that are the results of the testing of the controls. It is to be understood that the dependent application may include more or fewer object types than six, the types do not have to be associated hierarchical, and the object types do not have to be modeled as described in the example shown in FIG. 10 and it will still be within the scope of the present invention.

The object types of dependent application that are modeled in repository services 504 will have content in the form of data elements associated with each. These data elements may be stored in data layer 34 (FIG. 1) and accessed by the services layer as previously described.

Once the object types of the dependent application have been determined and modeled in the repository services, the content that is associated with each object type may be changed. That is, the system user can add to or subtract from existing content, add new content, delete existing content, or change the appearance of the content and it will be within the scope of the present invention.

If business application 552 was being used to evaluate a company, although each division or subsidiary would be using the same application for evaluation and using the same six object types described above, the object types may have different content based on the needs for the particular division or subsidiary, e.g., manufacturing, or research and development. However, if the application object types that have been modeled in the repository services do not address the needs of the division or subsidiary even if it used different content, then it may be necessary for that division or subsidiary to use a different dependent application that would include a different set of object types that would meet its particular needs. This new application may have a different hierarchy and associations of the object types. As such, it is understood that new object types may be modeled with regard to what is shown in FIG. 10, and object types may be deleted so that the application object types best meet the system user's needs. The system user also may change the field values for object types and content which can redefine the relationships of the associations between object types.

Once the application object types have been determined and modeled in the repository services, the system contemplates that there may be subtypes associated with one or more object types. These subtypes also may be populated with content in the form of data elements. The subtypes under a particular object type provide a means to better organize and categorize the content under a specific object type.

Preferably, there are two types of associations that will exist in the application modeled in repository services 504. The first is object-to-object associations. These associations between object types may be one-to-one, one-to-many, or many-to-many. This is what is shown, for example, in the hierarchical structure shown in FIG. 10. The second is object-to-attachment associations. These are attachments that are associated with a specific object type. Both of these associations will be discussed in detail subsequently.

The object types that are modeled in repository services 504 may have attachment associations. These attachments may be file, link, and "Form" attachments. File attachments would be actual files attached to the object type that would contain content. Link attachments would be URLs (universal resource locators) that are part of the content and will point to a resource over the Internet, the World-Wide Web, or other similar global communications system. "Form" attachments may be forms that define the hierarchical structure, define types, or define new objects that will become object types modeled in the repository services.

The data elements (content) that are associated with object types modeled in repository services 504 may be of various types. These include rich text type data, group selector type data, currency type data, date type data, and integer type data for the data. Rich text type data, for example, includes data formatting via HTML tags. Group selector type data, for example, includes group or user names as defined administratively via the security subsystem. Currency type data, for example, includes a decimal number formatted as currency. Date type data, for example, includes data in the form of dates, such as "January 21, 2005," "01/21/2005," or "21/01/2005" (European version). Integer type data, for example, includes data in the form of numbers including decimal numbers, fractions, negative numbers, and equations, Arabic numerals, Roman numerals, or other representations of numeric values.

As stated, access to the system of the present invention may be controlled by an access mechanism. This access mechanism is associated with user management and authentication service 154 in workflow and collaborative group services 150 (FIG. 3). This mechanism will permit access only to the levels of the application object types and related content for which authorization is granted or the content that is made visible to the system user based on access level. Therefore, if a system user was only given access to query certain specified levels of the object types, then that system user could access object types and content up that level, but not above it without being granted higher levels of access authorization. This access authorization also extends to read and write permissions associated with the object types.

Figure 11:
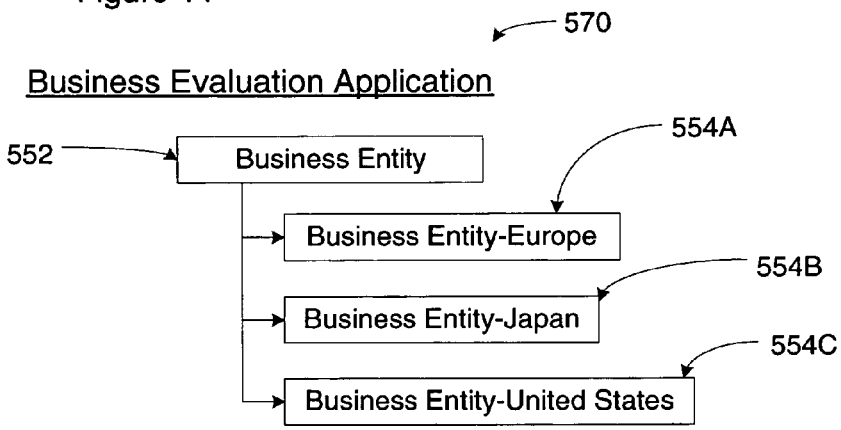
FIG. 11 shows a portion of the hierarchical structure for a dependent application that further shows examples of subtypes for a modeled object.

Referring to FIG. 11, generally at 570, a portion of the hierarchical structure of FIG. 10 is shown. This Figure shows subtypes associated with business entity 554. As shown in FIG. 11, business entity object type 554, for example, has three subtypes that will assist in the defining the data elements that are associated with the business entity object type 554. The first subtype is business entity—Europe at 554A, the second subtype is business entity—Japan, and the third subtype is business entity—United States. This would allow, for example, the European facilities to use what is necessary for them under a subtype business entity—Europe and turn off the application with regard to the other two areas, Japan and the United States, because it would not affect them.

Each of these subtypes will have data elements associated with it, and each will have an association with the other five enumerated object types. Further, any of the other five types may have subtypes formed under it in the same manner, and it will be within the scope of the present invention. This feature adds to the efficiency and speed in the use of the dependent application, and the flexibility of the system.

The hierarchical structure of the dependent application object modeled in repository services 504 provides an ability to conduct search queries at a level beyond simply searching for content in isolation. Accordingly, the search queries may take on a different character to obtain richer search results. This would include returning a subset of the hierarchical structures or an action item to name two. For example, a query search could be formulated that could ask for "high impact risks based on ineffective controls." This would return other than a pure content response. This will be described in view of FIG. 12.

Figure 12:
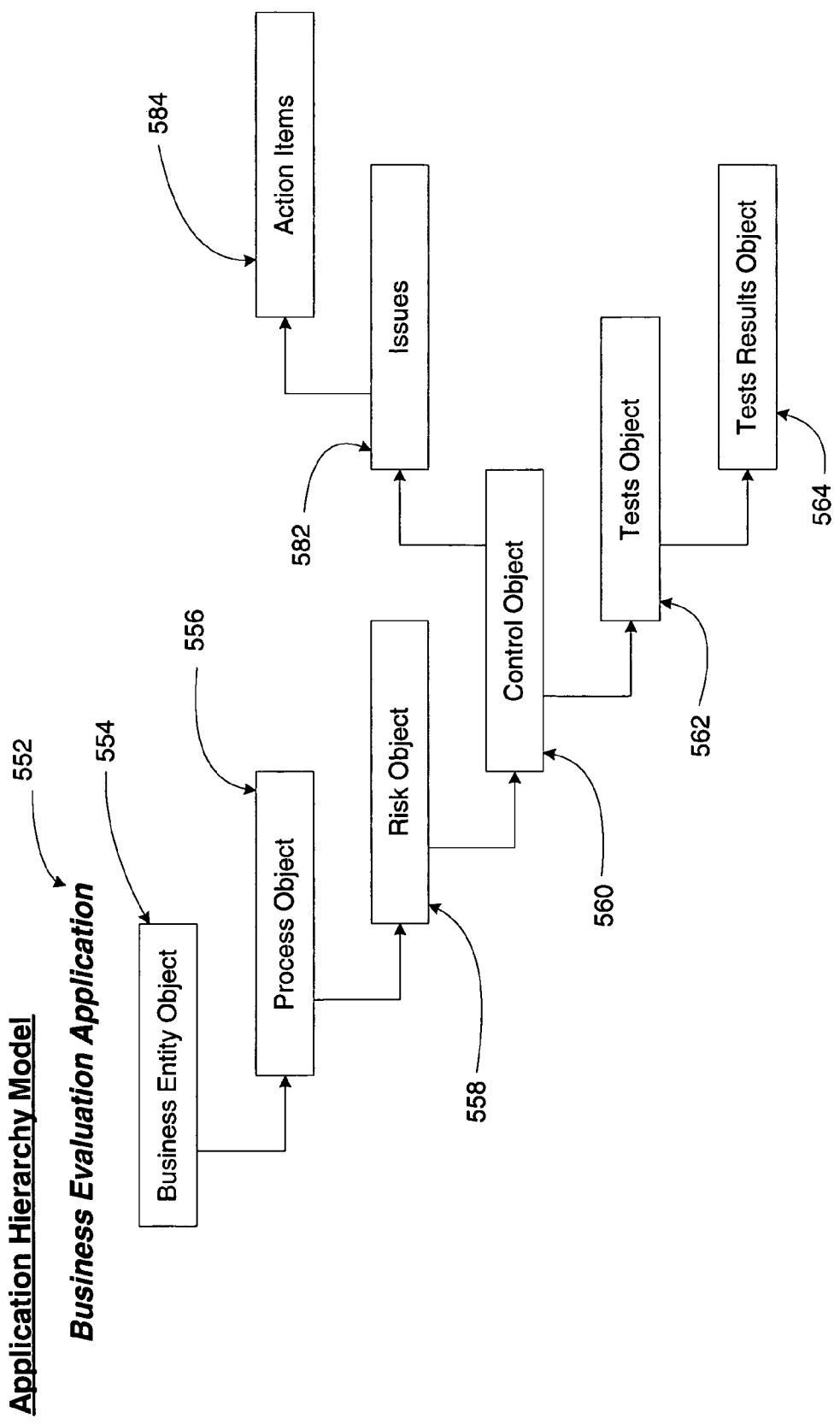
FIG. 12 shows a hierarchical structure for a dependent application similar to what is shown in FIG. 10 with additional associations for the control object.

FIG. 12, generally at 580, shows a hierarchical structure for an application modeled in the repository services similar to what is shown in FIG. 10 with additional associations for the control object type. Business evaluation application 552 has the following six object types to define the application the same as FIG. 10: business entities object type 554, business processes object type 556, risks object type 558, controls object type 560, tests object type 562, and test results object type 564. It also shows "issues" branching from the control object type and "action item" branching from "issues."

A proposed query search may involve a determination at "issues" at 582 and directed actions at "action items" at 584 when processing the request "high impact risks with ineffective controls." The issues that are raised by the query will then be addressed by specific action items returned by the search. Since there are no test results for these issues and action items, there would not be movement to the next two lower levels of association at the test and test results object types.

The hierarchical structure that is shown in FIGS. 1 and 12 at any particular point in time will contain very specific content in the various object types. Under certain circumstances, it may be important to know and preserve this specific state of the object types and their content. The preservation of this state may be performed by a snapshotting function of the system of the present invention. This function will snapshot the entire dependent application through the state of object types and their content. This snapshot may also be labeled and time stamped.

The labeling and timestamping of the state of the dependent application through the object types may be such that it cannot be changed or altered in any way. This will include, but not be limited, changes in content and resource relationships. The state of the dependent application at snapshot events may be reviewed at a later time for many purposes, one of which may be to compare the snapshot state with a later state of the application object types.

The labeling also provided a method to track system changes in a rapid and efficient manner. This ability to track the changes in the system resource relationships and the content will also permit that determination if someone tampered with these resource relationships and content in an unauthorized manner.

The snapshotting, labeling and timestamping also provides additional benefits. If, at some point, the system user desires to move back to a particular snapshot state of the object types, it may be so if authorized. Thereafter, the application will advance forward from that point. The intervening states of the application object types and content between the time of the snapshot and the current state of the object types will have no effect on the application any more. It would be as if they had never existed. However, to the extent that these states of the object types were labeled and snapshot during the period, they would have been saved by the system and could be selected at a later time to be made the current state of the object types.

Each time that the application object types are saved according to the system of the present invention, there will be a new version of the modeled application saved. Each saved version may be labeled and timestamped as discussed. The saved versions may be retrieved and viewed as desired by the system user. These saved versions are available for integration with publishing services 506 for the creation and distribution of desired reports on the state of the object types.

The reports that are created based on versions of the state of the object types at any given time will permit comparisons to be made between the states at these different times. This will permit the system user to be able to audit changes in the object types in performing these comparisons, for example, for evaluation of the company over time.

The object types of the application that are modeled in the repository may contain content that will notify a person or persons of the system user of changes in the state of the content of the object type or types of the modeled application.

For example, if a test is overdue, the person responsible for the test would be notified via e-mail to complete the test or that individual may be assigned an action item to the complete the test. This feature will be implemented through events and notification services 156 of workflow and collaboration group services 150 (FIG. 3).

The system of the present invention provides a method by which system users can configure the system without the prior act of coding the application object types. This may be accomplished by the system using a series of input vehicles that will define the data elements that will be related to each of the object types and their relationships. These input vehicles may be "Forms" that are specially created to embody the object types that are to be modeled in repository services. These Forms may define a new object type or be directed to augmenting the content that exists for object types that have been modeled in the repository services. The Forms will provide an ability to automatically embody these modeled objects without the need for prior coding.

The Forms may be constituted in a number of ways.

Figure 13:
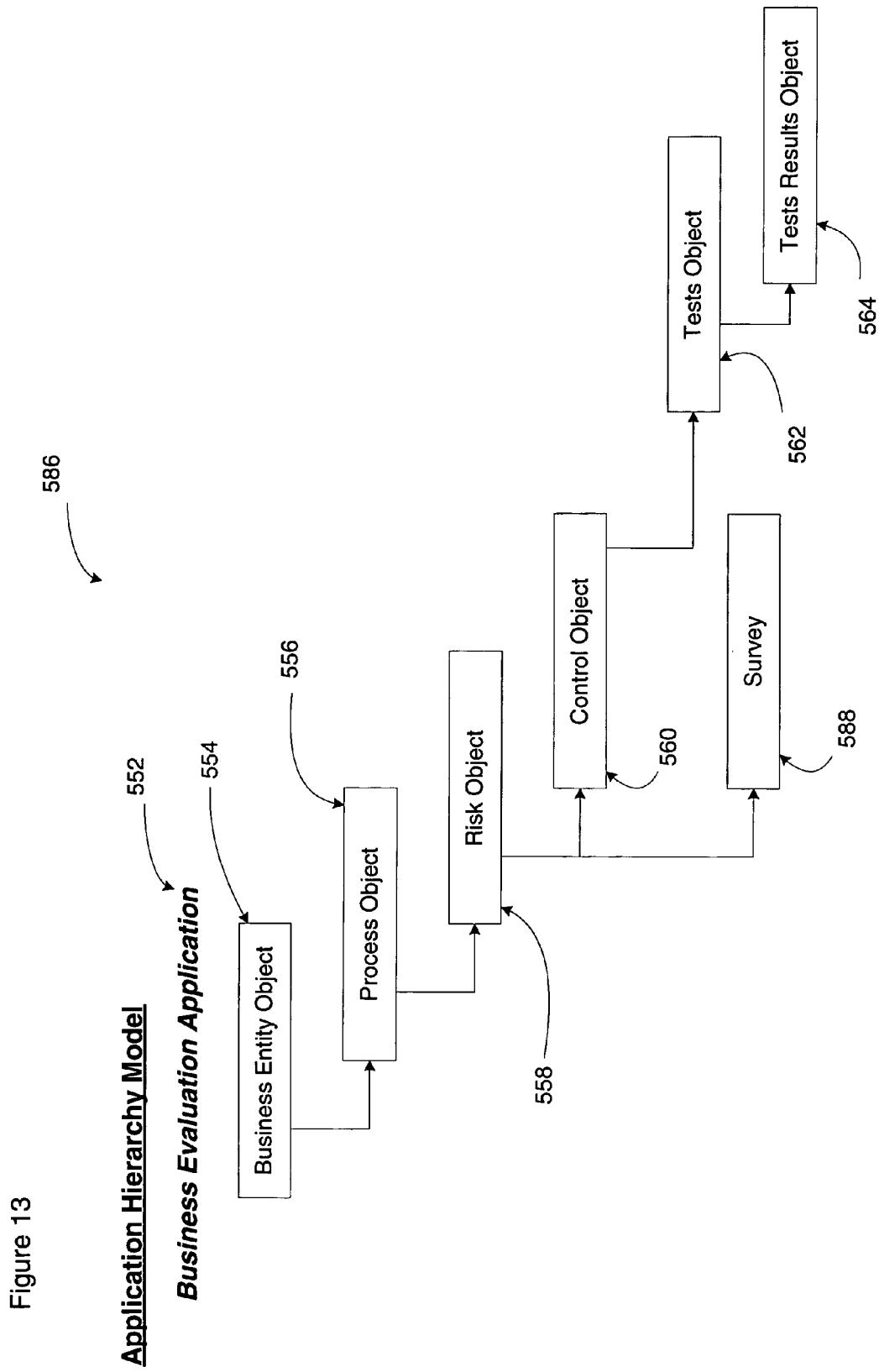
FIG. 13 shows a hierarchical structure for a dependent application that has been modeled in the repository services according to object type with an object type added using a "Form."

A "survey" is a type of "Form" that may be attached to add a object type to an existing hierarchical structure that is modeled in repository services 504. This is shown in FIG. 13. This Form type, in fact, may create a new object type for an existing hierarchical structure. The survey may be responded to by the appropriate entity.

Referring to FIG. 13, generally at 586, a hierarchical structure is shown that is modeled in repository services 504, however, this hierarchical structure shows the "Survey" Form type's as a files attachment associated with Risks object type 558. Survey object type 588 is at the same level and in a parallel relationship with Control object type 560 in its association with Risks object type 558.

"Form-based" content types, whether file attachment types ("Survey" object type 588 (FIG. 13)) or core object types (e.g., Risks, Controls object types, etc.), may have its rendering configured independently. The sequence of instructions for rendering "Form-based" content types may be implemented using Java Server Pages (JSP) technology from the J2EE platform. For each "Form-based" content type, an administrator may configure a different JSP (file containing JSP instructions) to execute and render instances of that type. The JSP instructions will control the layout and formatting of fields rendered for an object.

Snapshots of the state of the application object types including the data elements associated with each object types may be published using publishing service 506. For example, in publishing services 506 could publish reports relating to this state of the application object types and contents. This provides the system user with a means to retrieve information about the state, for example, of company business process at a given point in time when desired. The reporting may be associated with particular object types, the entire application represented by the object types, a subset of the object types, or Forms, e.g., surveys, that were created and attached to object types.

The content in the form of data elements that is associated with any of the object types may have a direct relationship in the control of workflow services 502. That is, the workflow services may have its path determined by content, for example, of field values contained in the content. There may be an unlimited number of fields associated with the content of a particular object type. Examples of content that may be contained in fields in the content includes enumerated values for ratings (Effective, Ineffective, Undetermined) or priorities (High, Medium, Low) or any other data type supported by repository services 504.

Figure 14:
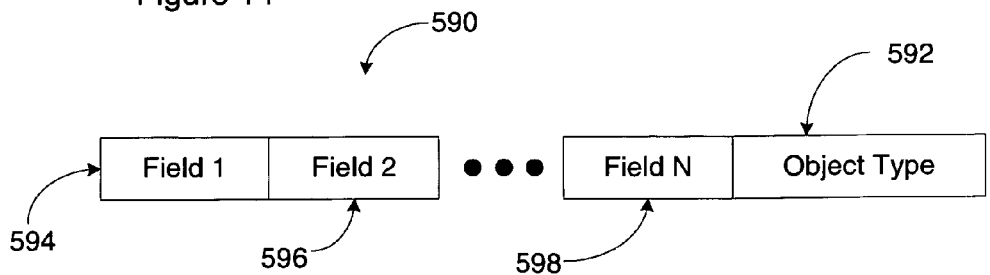
FIG. 14 shows a representation of an object and associated fields.

Referring to FIG. 14, generally at 590, a representation of an object type and associated fields is shown. Object type 592 may be any of the object types shown in FIG. 10 or one created from a survey. Object type 592 may have 1 to N fields associated with it and be within the scope of the present invention. FIG. 14 shows the relationship between an object type and fields. Referring to FIG. 14, Field 1 at 594, Field 2 at 596, and Field N at 598 associated with object type 592. As examples of what these fields could contain if object 592 was process object 556 in FIG. 10 are Field 1 could contain a "Name," Field 2 could contain a "Description," and Field N could contain the "Owner."

An example of content controlling the workflow service may be found if the following condition existed: there was a survey associated with control object type 560 for a particular risk object type 558 (FIG. 10, 12 or 13) and there was a task to fill out the survey. After this task was completed, there would be a review of the survey. If the survey rated the effectiveness of the controls for the risk at a rating of 1-5 in a 10-point scale, then a first action would be taken; however, if the rating is 6-10, then a second action would be taken. This alternative routing of workflow would be included in the field values for the object type. Thus, the content of the survey would impact the workflow services 502. This example is graphically shown in FIG. 14 and will be described.

Figure 15:
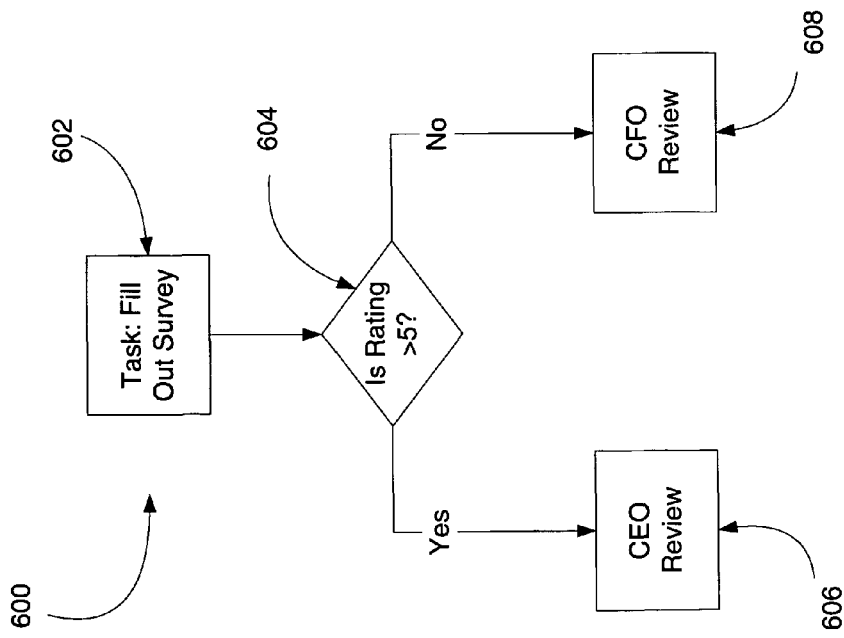
FIG. 15 shows a first example of object content influencing workflow services.

Referring to FIG. 15, generally at 600, there was a task under the controls object type for filling out a survey. The task is shown at 602. This survey is for evaluating the effectiveness of the controls for a particular risk. This task is to be completed by a particular person or persons in the organization assigned that responsibility. The subsequent task is a contingent task for an entity in the organization depending on the outcome of the survey. As shown in FIG. 15, the results of the survey are applied to decision block 604. At the decision block, if the overall rating of the survey is between 6-10, an indication that the controls are effective for the risk, the task for reviewing of the results would go to the CFO at 608. If, on the other hand, the rating is 1-5, an indication that the controls are ineffective for the risk, the task for reviewing of the results would go to the CEO at 606. Thus, the content of the survey would control the workflow of the application according to the field values that would dictate the alternative routing just described.

Figure 16:
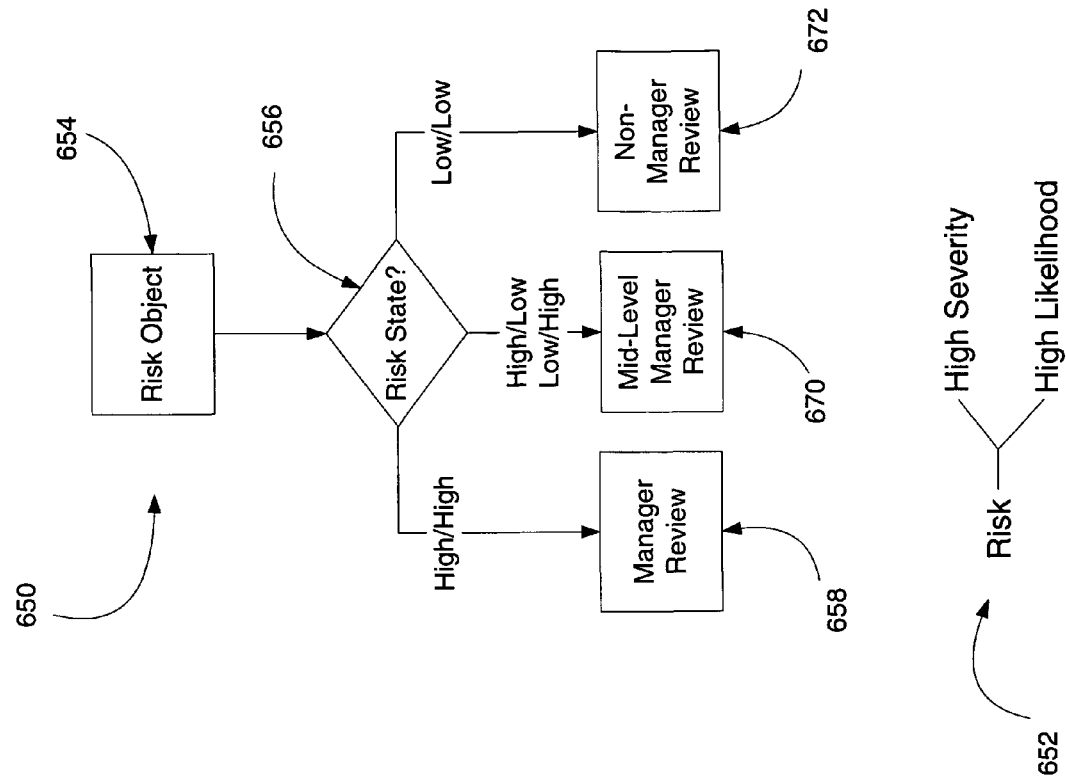
FIG. 16 shows a second example of object content influencing workflow services.

Referring to FIG. 16, generally at 650, another example of workflow being controlled by the content is shown. At 652, a particular risk object type is characterized by the "severity of the risk" and the "likelihood of the risk" fields associated with that particular risk. Each of these fields could be assessed on a numerical standard, a simple HIGH/LOW standard, or other standard determined by the system user. This assessment may be implemented by a survey. An evaluation of the fields of the risk object type 654 will cause movement to decision block 656. The conditions of the fields will determine the workflow branching and the entity that will be assigned a task. If, for each field, the evaluation may be either HIGH or LOW, the entity that will be assigned a task is shown graphically in FIG. 16. If the evaluation is that the severity and likelihood of the risk are HIGH/HIGH, then the manager at 658 will be assigned the task of reviewing the risk. If the risk evaluation is LOW/LOW, then the non-manager at 670 will be assigned the task of reviewing the risk. Finally, if the results of the evaluation are mixed, HIGH/LOW or LOW/HIGH, then the middle-manager at 672 will be assigned the task of reviewing the risk. In each case, the content that was created by the evaluation of the risk fields controlled the workflow.

Another method that the present invention employs to control workflow services using content is to specify in the content itself where routing is to be directed. For example, a specific person or persons in an organization may be designated in the content of the process object type as the "owner" of the process. This would mean that that person or those persons would be automatically assigned to the task of reviewing the different aspects of the process in the course of evaluating that business process.

A further method by which the system of the present invention uses content to control workflow is its ability to recursively assign tasks within a particular object type using the content of its associations. This will permit the system to divide an object type into sub-elements, sub-sub-elements, etc.

As an example, there may be a company process that must be signed-off at each level of the company. This includes the home office, the regional office, the area office, the group office, and finally the manufacturing facility that employs the process. The home office would initiate the action of the requirement for all levels of the company to signoff on the process. The association between business entities will be recursively navigated based on the recursive hierarchy of the business entity that was described previously. The workflow will follow this recursive control. Accordingly, the home company will send the action to the level below it in the hierarchical structure by calling the same action and "passing in" each business entity at this next level. This next level, the area office, will repeat this process for each group office. At this point, the task at the group office level will proceed with review and signoff and send control back to the next level above it for review and signoff. This will continue until the review and signoff is completed by the home office. This workflow was controlled by the recursive navigation of the objects' associations.

The publishing of reports via publishing services 506 preferably involves dynamically published pages. The publishing services 506 operate within the parameters of multi-channel deployment group 250 (FIG. 5). The pages are code-based so they are compatible with any platform that is supported by that code. For example, the pages could be based on JAVA™ code, and, as such, these pages could integrate with any system supported by JAVA™.

The pages that are created may be parameterized around a basic template. As such, the template many be used over and over to create other pages by redefining and modifying the parameters.

The published pages and templates are constructed from the application object types. Therefore, they will be subject to the access control mechanism that has been previously described.

Preferably, the page content for published reports is generated in HTML and can link to any object type of the application modeled in the repository services. Thus, these links to detailed pages within an object type that is modeled can be created as part of the report. As such, a system user would be able to run a report on a display and use it to navigate a detail pointed to by the link in the report. The system user upon accessing the link could make changes to the detail that was accessed and then go back to the report, which could then be refreshed with the new information.

According to the present invention, the report pages and page templates may be constructed from the object types themselves. This would permit organization of reports according to the hierarchical structure of the modeled application. A method to effect this, preferably, would be to organize the reports in folders corresponding to the various object types. This organizational model would also permit easy use of access control that was previously discussed.

The embodiments of the present invention that have described the foregoing are not limited only to the embodiments described above. The descriptions are applicable in any computing or processing environment. The embodiments may be implemented in hardware, software, or a combination of the two. For example, the embodiments may be implemented using circuitry, such as one or more of programmable logic (e.g., an ASIC), logic gates, a processor, and a memory.

The embodiments may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments may also be implemented as a machine-readable storage medium, configured with a computer program, where, upon execution, instructions in the computer program cause a machine to operate to perform the functions of the embodiments described above.

The embodiments described above may be used in a variety of applications. Although the embodiments are not limited in this respect, the embodiments may be implemented with memory devices in microcontrollers, general purpose microprocessors, digital signal processors (DSPs), reduced instruction-set computing (RISC), and complex instruction-set computing (CISC), among other electronic components. Moreover, the embodiments described above may also be implemented using integrated circuit blocks referred to as main memory, cache memory, or other types of memory that store electronic instructions to be executed by a microprocessor or store data that may be used in arithmetic operations.

The terms and expressions that are employed herein are terms or descriptions and not of limitation. There is no intention in the use of such terms and expressions of excluding the equivalents of the feature shown or described, or portions thereof, it being recognized that various modifications are possible within the scope of the invention as claimed.

We claim:

1. A non transitory computer-readable storage medium storing an adaptive content platform, the adaptive content platform, comprising:
  (a) at least one content-enabled, dependent application, that includes at least a user interface and business logic; and
  (b) a services layer that is in communications with content-enabled, dependent applications supported by the adaptive content platform for at least repository services for modeling the at least one content-enabled, dependent application, with the modeling including the at least one content-enabled, dependent application or each of a plurality of content-enabled, dependent applications being configured to interface with services of the services layer to enable specific model content from the services layer to be combined to define and build a combination application for the at least one content-enabled, dependent application and each of the plurality of content-enabled dependent applications to emulates a stand-alone independent application.

2. The adaptive content platform stored on the computer-readable medium as recited in claim 1, wherein the services layer includes workflow, repository, and publishing services.

3. The adaptive content platform stored on the computer-readable medium as recited in claim 2, wherein the repository services are in communications with the workflow services to leverage workflow for the at least one content-enabled, dependent application.

4. The adaptive content platform stored on the computer-readable medium as recited in claim 2, wherein the repository services are in communications with the publishing services to leverage publishing of information or data generated by the at least one content-enabled, dependent application.

5. A computer-implemented method for integrating at least one content-enabled, dependent application with a computer-implemented an adaptive content platform comprising the steps of:
  (a) forming an adaptive content platform that has at least:
    (1) an application layer that will support at least one content-enabled, dependent application, and
    (2) a services layer that is in communications with the application layer, with the services layer supporting shared services for content-enabled, dependent applications supported by the application layer, with the shared services including at least repository services;
  (b) object modeling each content-enabled, dependent application that is sharing the services of the services layer according to a predetermined structure, with the object modeling including the at least one content-enabled, dependent application or each of a plurality of content-enabled dependent applications being configured to interface with the services of the services layer to enable specific model content from the services layer to be combined to define and build defining and building each content enabled, dependent application to emulates a combination application for the at least one content-enabled, dependent application and each of the plurality of content-enabled dependent applications to emulate a stand-alone independent application;
  (c) separately saving each object modeled content-enabled, dependent application in the repository services according to its object type structure; and
  (d) operating each content-enabled, dependent application according to its programming using the shared services.

6. The computer-implemented method as recited in claim 5, wherein the shared services include workflow, repository, and publishing services.

7. The computer-implemented method as recited in claim 5, wherein the predetermined structure includes a hierarchical structure.

8. The computer-implemented method as recited in claim 7, wherein the hierarchical structure includes at least two associated object types.

9. The computer-implemented method as recited in claim 5, wherein the method further includes increasing the number of object types for modeling a content-enabled, dependent application subsequent to developing and saving the hierarchical structure in the repository services.

10. The computer-implemented method as recited in claim 5, wherein the method includes structuring the object types to include at least one object sub-type.

11. The computer-implemented method as recited in claim 10, wherein the method further includes each sub-types associated with an object type being capable of turning off other sub-types associated with such object type.

12. The computer-implemented method as recited in claim 5, wherein the method further includes recursively searching an object type and associated sub-types.

13. The computer-implemented method as recited in claim 5, wherein object modeling each content-enabled, dependent application that is sharing the services of the services layer according to a predetermined structure, further includes associating at least one field with an object type, with such field containing content.

14. The method as recited in claim 13, the method further includes associating at least two fields with a particular object type.

15. The computer-implemented method as recited in claim 13, the method further includes associating a substantially unlimited number of fields with a particular object type.

16. The computer-implemented method as recited in claim 5, wherein an object type that is modeled in the repository services includes having content associated with the object type, with the content including content stores stored in a data layer in communications with the services layer.

17. The computer-implemented method as recited in claim 13 or 16, wherein conducting query searches include searching for specific content to be returnable to a system user.

18. The computer-implemented method a recited in claim 13 or 16, wherein conducting query searches include multi-level searching of a hierarchical structure of an content-enabled, dependent application modeled in the repository services that is returnable to the system user.

19. The computer-implemented method as recited in claim 5, wherein the method further includes making attachments to at least one object type modeled in the repository services.

20. The computer-implemented method as recited in claim 19, wherein the method further includes making a file attachment to at least one object type modeled in the repository services.

21. The computer-implemented method as recited in claim 19, wherein the method further includes making a link attachment to at least one object type modeled in the repository services.

22. The computer-implemented method as recited in claim 19, wherein the method further includes making a form attachment to at least one object type modeled in the repository services.

23. The computer-implemented method as recited in claim 22, wherein the method further includes making a survey attachment to at least one object type modeled in the repository services.

24. The computer-implemented method as recited in claim 5, wherein the method further includes snapshotting a state of a content-enabled, dependent application modeled in the repository services at a specific point in time.

25. The computer-implemented method as recited in claim 24, wherein the method further including retrieving a snapshot state on the content-enabled, dependent application modeled in the repository services at a time subsequent to the time it was snapshot.

26. The computer-implemented method as recited in claim 25, wherein the method further including retrieving a snapshot state on the content-enabled, dependent application modeled in the repository services at a time subsequent to the time it was snapshot and making the retrieved snapshot state a current state of the content-enabled, dependent application modeled in the repository services.

27. The computer-implemented method as recited in claim 5, wherein a system user's ability view the object types for the content-enabled, dependent application modeled in the repository services includes access controlling an ability to view such object types.

28. The computer-implemented method as recited in claim 5, wherein a system user's ability to make changes to the object types for the content-enabled, dependent application modeled in the repository services includes access controlling an ability to make changes to such object types.

29. The computer-implemented method as recited in claim 5, wherein the method further includes the repository services communicating with workflow services to leverage workflow for at least one content-enabled, dependent application.

30. The computer-implemented method as recited in claim 25, wherein the method further includes the repository services communicating with the publishing services to leverage publishing information or data generated by at least one content-enabled, dependent application.

31. The computer-implemented method as recited in claim 29, wherein the method further includes using content associated with at least one object type modeled in the repository services to control the workflow for at least one content-enabled, dependent application through the workflow services.

32. The computer-implemented method as recited in claim 5, wherein the method further includes notifying a system user of an action to be performed according to the operation of at least one content-enabled, dependent application.

33. The computer-implemented method as recited in claim 25, wherein the method further includes labeling a snapshot state of a content-enabled, dependent application modeled in the repository services.

34. The computer-implemented method a recited in claim 25, wherein the method further includes timestamping a snapshot state of a content-enabled, dependent application modeled in the repository services.

35. The computer-implemented method as recited in claim 25, wherein the method further includes saving snapshot state of a content-enabled, dependent application as a retrievable version of such content-enabled, dependent application.

36. A computer-implemented method for integrating at least one content-enabled, dependent application with a computer-implemented an adaptive content platform comprising the steps of:
   (a) forming an adaptive content platform that has at least:
       (1) an application layer that will support at least one content-enabled, dependent application,
       (2) a services layer that is in communications with the application layer with the services layer supporting shared services for content-enabled, dependent applications supported by the application layer, with the shared services including at least repository services, and
       (3) a data layer that is at least in communication with the services layer, with data layer containing content that is associated with at least an object type modeled in the repository services;
   (b) object modeling each content-enabled, dependent application that is sharing the services of the services layer according to a predetermined structure, with the object modeling including the at least one content-enabled, dependent application or each of a plurality of content-enabled dependent applications being configured to interface with the services of the services layer to enable specific model content from the services layer to be combined to define and build defining and building each content enabled, dependent application to emulates a combination application for the at least one content-enabled, dependent application and each of the plurality of content-enabled dependent applications to emulate a stand-alone independent application;
   (c) separately saving each object modeled content-enabled, dependent application in the repository services according to its object type structure; and
   (d) operating each content-enabled, dependent application according to its programming using the shared services.

37. The computer-implemented method as recited in claim 36, wherein the shared services include workflow, repository, and publishing services.

38. The computer-implemented method as recited in claim 36, wherein the predetermined structure includes a hierarchical structure.

39. The computer-implemented method as recited in claim 38, wherein the hierarchical structure includes at least two associated object types.

40. The computer-implemented method as recited in claim 36, wherein the method further includes increasing the number of object types for modeling a content-enabled, dependent application subsequent to developing and saving the hierarchical structure in the repository services.

41. The computer-implemented method as recited in claim 36, wherein the method includes structuring the object types to include at least one object sub-type.

42. The computer-implemented method as recited in claim 41, wherein the method further includes each sub-types associated with an object type being capable of turning off other sub-types associated with such object type.

43. The computer-implemented method as recited in claim 36, wherein the method further includes recursively searching an object type and associated sub-types.

44. The computer-implemented method as recited in claim 36, wherein object modeling each content-enabled, dependent application that is sharing the services of the services layer according to a predetermined structure, further includes associating at least one field with an object type, with such field containing content.

45. The computer-implemented method as recited in claim 44, the method further includes associating at least two fields with a particular object type.

46. The computer-implemented method as recited in claim 44, the method further includes associating a substantially unlimited number of fields with a particular object type.

47. The computer-implemented method as recited in claim 44, wherein conducting query searches include searching for specific content to be returnable to a system user.

48. The computer-implemented method a recited in claim 44, wherein conducting query searches include multi-level searching of a hierarchical structure of an content-enabled, dependent application modeled in the repository services that is returnable to the system user.

49. The computer-implemented method as recited in claim 36, wherein the method further includes making attachments to at least one object type modeled in the repository services.

50. The computer-implemented method as recited in claim 49, wherein the method further includes making a file attachment to at least one object type modeled in the repository services.

51. The computer-implemented method as recited in claim 49, wherein the method further includes making a link attachment to at least one object type modeled in the repository services.

52. The computer-implemented method as recited in claim 49, wherein the method further includes making a form attachment to at least one object type modeled in the repository services.

53. The computer-implemented method as recited in claim 52, wherein the method further includes making a survey attachment to at least one object type modeled in the repository services.

54. The computer-implemented method as recited in claim 36, wherein the method further includes snapshotting a state of a content-enabled, dependent application modeled in the repository services at a specific point in time.

55. The computer-implemented method as recited in claim 54, wherein the method further including retrieving a snapshot state on the content-enabled, dependent application modeled in the repository services at a time subsequent to the time it was snapshot.

56. The computer-implemented method as recited in claim 55, wherein the method further including retrieving a snapshot state on the content-enabled, dependent application modeled in the repository services at a time subsequent to the time it was snapshot and making the retrieved snapshot state a current state of the content-enabled, dependent application modeled in the repository services.

57. The computer-implemented method as recited in claim 36, wherein a system user's ability view the object types for the content-enabled, dependent application modeled in the repository services includes access controlling an ability to view such object types.

58. The computer-implemented method as recited in claim 36, wherein a system user's ability to make changes to the object types for the content-enabled, dependent application modeled in the repository services includes access controlling an ability to make changes to such object types.

59. The computer-implemented method as recited in claim 36, wherein the method further includes the repository services communicating with workflow services to leverage workflow for at least one content-enabled, dependent application.

60. The computer-implemented method as recited in claim 55, wherein the method further includes the repository services communicating with the publishing services to leverage publishing information or data generated by at least one content-enabled, dependent application.

61. The computer-implemented method as recited in claim 59, wherein the method further includes using content associated with at least one object type modeled in the repository services to control the workflow for at least one content-enabled, dependent application through the workflow services.

62. The computer-implemented method as recited in claim 36, wherein the method further includes notifying a system user of an action to be performed according to the operation of at least one content-enabled, dependent application.

63. The computer-implemented method as recited in claim 55, wherein the method further includes labeling a snapshot state of a content-enabled, dependent application modeled in the repository services.

64. The computer-implemented method a recited in claim 55, wherein the method further includes timestamping a snapshot state of a content-enabled, dependent application modeled in the repository services.

65. The computer-implemented method as recited in claim 55, wherein the method further includes saving snapshot state of a content-enabled, dependent application as a retrievable version of such content-enabled, dependent application.

* * * * *